(12) United States Patent
Suddaby

(10) Patent No.: US 6,624,274 B1
(45) Date of Patent: Sep. 23, 2003

(54) POLYMERS HAVING NOVEL CURE SYSTEM

(75) Inventor: Kevin Grant Suddaby, Morrisville, NC (US)

(73) Assignee: Dow Reichhold Specialty Latex LLC, Research Triangle Park, NC (US)

( * ) Notice: Subject to any disclaimer, the term of this patent is extended or adjusted under 35 U.S.C. 154(b) by 101 days.

(21) Appl. No.: 09/711,225

(22) Filed: Nov. 9, 2000

(51) Int. Cl.[7] .................. C08F 120/68; C08F 220/68; C08F 112/08
(52) U.S. Cl. .................. 526/318; 526/318.43; 526/325; 526/347.1; 526/335; 526/318.2; 526/318.3; 526/319
(58) Field of Search .................. 526/87, 318.43, 526/325, 916, 347, 347.1, 335, 318, 318.2, 318.3, 319, 303.1, 316; 524/560

(56) References Cited

U.S. PATENT DOCUMENTS

| | | | |
|---|---|---|---|
| 2,527,162 A | 10/1950 | Vanderbilt et al. | 260/80.7 |
| 2,574,894 A | 11/1951 | Snyder et al. | 260/84.3 |
| 2,575,135 A | 11/1951 | Schulze et al. | 260/84.1 |
| 3,174,953 A | 3/1965 | Ogle | 260/83.7 |
| 3,670,011 A * | 6/1972 | Moody et al. | 524/553 |
| 4,421,889 A | 12/1983 | Braun et al. | 524/381 |
| 4,963,623 A | 10/1990 | Miller et al. | 525/237 |
| 5,014,362 A | 5/1991 | Tillotson et al. | 2/168 |
| 5,026,860 A | 6/1991 | Buchan et al. | 546/271 |
| 5,039,750 A | 8/1991 | Miller et al. | 525/237 |
| 5,045,611 A | 9/1991 | McNeil et al. | 526/81 |
| 5,084,514 A | 1/1992 | Szechura et al. | 525/123 |
| 5,143,971 A | 9/1992 | Stanislawczyk | 524/833 |
| 5,164,444 A * | 11/1992 | Bernard | 524/833 |
| 5,177,164 A | 1/1993 | De Vries et al. | 526/82 |
| 5,195,537 A | 3/1993 | Tillotson | 128/844 |
| 5,206,319 A | 4/1993 | Kobayashi et al. | 526/224 |
| 5,278,227 A | 1/1994 | Bernard | 524/817 |
| 5,284,157 A | 2/1994 | Miller et al. | 128/844 |
| 5,284,607 A | 2/1994 | Chen et al. | 264/37 |
| 5,338,565 A | 8/1994 | Shlenker et al. | 427/2.25 |
| 5,362,798 A * | 11/1994 | Hayes | 524/558 |
| 5,370,900 A | 12/1994 | Chen | 427/2.3 |
| 5,376,727 A | 12/1994 | Iqbal et al. | 525/196 |
| 5,385,997 A | 1/1995 | Buchan et al. | 526/259 |
| 5,484,840 A | 1/1996 | Binkley | 524/501 |
| 5,910,533 A | 6/1999 | Ghosal et al. | 524/560 |

FOREIGN PATENT DOCUMENTS

| | | | |
|---|---|---|---|
| EP | 0393871 | 3/1990 | C09K/3/10 |
| GB | 795706 | 5/1958 | |
| WO | WO 99/06481 | 7/1998 | C08L/13/02 |
| WO | WO 01/07515 | 6/2000 | C08L/13/02 |

OTHER PUBLICATIONS

Grawe, et al.; "Chelation As a Means of Developing Crosslinking Emulsions", Journal of Coatings Technology, vol. 52, No. 661, Feb. 1980 (pp. 73–87).

Clemens, et al.; "A Comparison of Catalysts for Crosslinking Acetoacetylated Resins via the Michael Reaction", Journal of Coatings Technology, vol. 61, No. 770, Mar. 1989 (pp. 83–91).

Rector, et al.; "Applications for Acetoacetyl Chemistry in Thermoset Coatings", Journal of Coatings Technology, vol. 61, No. 771, Apr. 1989, (pp. 31–37).

Eastman Chemical Company, "Waterborne Acrylic Emulsion Formulation Using *Eastman* Acetoacetoxyethyl Methacrylate (AAEM)", Publication N–344, Sep. 1994.

Eastman Chemical Company, "Acetoacetoxyethyl Methacrylate (AAEM) Acetoacetyl Chemistry", Publication N–319B, Jun. 1995.

Eastman Chemical Company, "Utility of Acetoacetoxyethyl Methacrylate (AAEM) in Thermoset Coatings", Publication N–322C, Nov. 1998.

* cited by examiner

*Primary Examiner*—Robert Harlan
(74) *Attorney, Agent, or Firm*—Myers Bigel Sibley & Sajovec, PA

(57) ABSTRACT

The present invention provides a polymer composition capable of being cured or crosslinked in the absence or without the use of conventional sulfur and accelerator cure systems. The polymer is formed from olefinically unsaturated monomers and includes at least one conjugated diene monomer. Such polymer includes additional functionality provided by a chelating monomer.

21 Claims, No Drawings

POLYMERS HAVING NOVEL CURE SYSTEM

FIELD AND BACKGROUND OF THE INVENTION

The present invention relates to polymer compositions useful in a wide variety of fields, including making elastomeric articles of manufacture. Particularly, compositions of the present invention are useful in crosslinkable films, coatings, adhesives, gaskets and the like. The compositions are particularly useful when there is a need to avoid using conventional cure systems, namely sulfur-based systems.

In general, many conventional polymer compositions used in films, coatings and adhesives utilize sulfur-based cure systems. Sulfur-based links are introduced during the crosslinking of the polymer composition. In addition to sulfur, accelerators such as amines, thiazoles, sulfonamides, dithiocarbonates and thiuram are utilized. It would be desirable to eliminate the use of sulfur-based crosslinking agents and accelerators which may generate nitrosamines and cause copper staining, allergies and sensitization to accelerator residues and potential contamination of the films, coatings and adhesives. The potential also exists for curing agents or curing agent residues that are not bound to the polymer chains to bloom to the surface of the polymer. In practice this is sometimes seen as sulfur blooming and is undesirable since it can lead to particulate contamination, a particular concern in controlled environments. Blooming from the cure system can also alter performance properties in applications such as gasketing where it can interfere with adhesion or sealing properties.

Several alternatives to conventional cure systems exist such as the incorporation of functionality into a polymer through the use of N-methylol acrylamide and derivatives. While these provide suitable performance in some applications, residues associated with these materials such as acryamide, formaldehyde, and other volatile organic compounds are undesirable in many applications.

Allergies and sensitization is particularly a problem in medical gloves made from polymer latex compositions. Latex gloves are preferred since they can be made light, thin, flexible, tight-fitting, and substantially impermeable to a variety of liquids and gases. It is often desirable that the gloves possess adequate physical properties such as tensile strength and elongation, and are comfortable to the wearer. It is also desirable that the gloves possess adequate aesthetic properties with respect to drape, softness, etc., provide a good barrier to microbial penetration, and be substantially odorless. A combination of high tensile strength and elongation combined with a low modulus is typically preferred.

Conventional latex gloves have typically been formed of natural rubber primarily due to their resiliency, softness, adequate physical properties, and good elastic recovery. Nonetheless, many wearers of such gloves are allergic to proteins found in natural rubber. These individuals often experience difficulty when wearing the gloves. As a result, there have been efforts to develop gloves made from synthetic materials which are comparable to the natural rubber gloves in terms of comfort and physical properties. One synthetic alternative focuses on using poly(vinylchloride) (PVC). PVC is typically plasticized in order to be pliable enough to use in glove applications. Gloves formed from PVC are undesirable in many respects. For example, the gloves do not possess a soft and rubbery feel. Furthermore, the plasticizer may migrate through the PVC and leach out when in contact with solvents. Also, it is believed that synthetic gloves formed from these plasticized vinyl materials may provide an insufficient barrier to microbes due to imperfections in the film. Additionally, these gloves tend to display inadequate elastic recovery (snap) properties and poor softness. Various other glove materials are disclosed in U.S. Pat. No. 5,014,362 to Tillotson, U.S. Pat. No. 5,910,533 to Ghosal et al., and U.S. Pat. No. 5,997,969 to Gardon.

There, however, continues to be a need for polymers that can be cured in the absence of sulfur and accelerators. Such polymers should have the desirable characteristics of the conventional polymers, maintain the desired aesthetic and physical properties (e.g., high tensile strength and elongation properties); and obviate the undesirable features of polymers, that occur when using conventional sulfur-based cure systems, namely blooming, copper staining, allergies and sensitization to accelerator residues, and potential contamination in articles of manufacture sensitive to sulfur or accelerator residues.

SUMMARY OF THE INVENTION

To these ends, and to other objects and advantages, the present invention provides a polymer composition capable of being cured or crosslinked in the absence or without the use of conventional sulfur and accelerator cure systems and/or accelerators. The polymer is formed from at least one olefinically unsaturated monomers, and includes a conjugated diene monomer. Such polymer includes additional functionality provided by a chelating monomer. A suitable chelating monomer is an acetoacetoxy functionalized monomer. Such a polymer can then be crosslinked with a polyvalent metal ion crosslinking agent without the use of sulfur-based curing agents and/or accelerators. One use of such a polymer is a film to form various elastomeric articles of manufacture such as gloves, condoms, finger cots, etc. Another use of such a polymer is as a binding agent in articles of manufacture such as gaskets.

DETAILED DESCRIPTION OF THE INVENTION

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The polymer composition is formed from olefinically unsaturated monomers wherein the polymer contains at least one conjugated diene monomer and additional functionality provided by a chelating monomer. Suitable conjugated diene monomers that may be used include, but are not limited to $C_4$ to $C_9$ dienes such as, for example, butadiene monomers such as 1,3-butadiene, 2-methyl-1,3-butadiene, and the like. Blends or copolymers of the diene monomers can also be used. A particularly preferred conjugated diene is 1,3-butadiene.

The polymer may also optionally include other olefinically unsaturated monomers. Suitable olefinically unsaturated monomers include $\alpha,\beta$-unsaturated carboxylic acids, their anhydrides, and their aliphatic alicyclic, aromatic and heteroaromatic (partial) ester or (partial) amides such that the carbon skeletons of the base alcohols and amines of the esters and amides contain from about 1 to 20 carbon atoms in their carbon skeletons. Other suitable olefinically unsaturated monomers include $\alpha,\beta$-unsaturated nitriles, vinyl aromatics, vinyl halides, and vinyl esters of aliphatic carboxylic acids having between about 2 and 20 carbon atoms, and vinyl ethers of aliphatic, alicyclic, aromatic, and heteroaromatic alcohols having from 1 to 18 carbon atoms.

Sutiable α,β-unsaturated carboxylic acids include itaconic, maleic, fumaric, and preferably acrylic and methacrylic acid.

Suitable esters or amides include methyl (meth)acrylate, ethyl (meth)acrylate, propyl (meth)acrylate, isopropyl (meth)acrylate, butyl (meth)acrylate, sec-butyl (meth) acrylate, tert-butyl (meth)acrylate, 2-ethyl hexyl (meth) acrylate, glycidyl (meth)acrylate, hydroxyethyl (meth) acrylate, hydroxypropyl (meth)acrylate, hydroxybutyl (meth)acrylate, β-carboxyethyl acrylate, monomethyl maleate, dimethyl maleate, monooctyl maleate, monomethyl itaconate, dimethyl itaconate, di(ethylene glycol) maleate, di(ethylene glycol) itaconate, 2-hydroxyethyl methyl fumarate, ethylene glycol di(meth)acrylate, hexamethylene glycol di(meth)acrylate, maleimide, 3-chloro-2-hydroxybutyl methacrylate, dimethylaminoethyl (meth) acrylate and their salts, 2-sulfoethyl (meth)acrylate and their salts, diethylaminoethyl (meth)acrylate and their salts, methoxy polyethylene glycol mono(meth)acrylate, tert-butylaminoethyl (meth)acrylate and their salts, benzyl (meth)acrylate, isobornyl (meth)acrylate, isodecyl (meth) acrylate, cyclohexyl (meth)acrylate, lauryl (meth)acrylate, methoxyethyl (meth)acrylate, hexyl (meth)acrylate, stearyl (meth)acrylate, allyl (meth)acrylate, ethoxylated nonylphenol (meth)acrylate, tridecyl (meth)acrylate, caprolactone (meth)acrylate, propoxylated allyl (meth)acrylate, tetrahydrofurfuryl (meth)acrylate, (meth)acrylamide, 2-acrylamido-2methylpropanesulfonic acid, N-isopropyl (meth)acrylamide, tert-butyl(meth)acrylamide, N,N'-methylene-bis-(meth)acrylamide, N,N-dimethyl(meth) acrylamide, and N-methylol(meth)acrylamide.

Suitable vinylaromatic monomers include styrene, (x-methylstyrene, p-methylstyrene, p-methoxystyrene, vinlytoluene, chlorostyrene, vinyl benzylchloride, vinyl pyridine, and vinyl napthalene.

Suitable vinyl halides include vinyl chloride and vinylidene chloride.

Suitable unsaturated nitriles include acrylonitrile and methacrylonitrile.

Preferably, the chelating monomer contains a chelating functionality with the structure

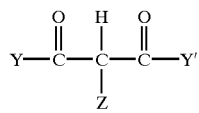

wherein Z is

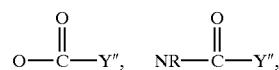

or Y", and Y, Y' and Y" are independently selected from the group consisting of NRR', OR or R wherein R and R' are independently selected from the group consisting of hydrogen and aliphatic, alicyclic, aromatic and heteroaromatic groups and at least one of Y, Y' and Z contains an olefinic unsaturation. Such a chelating monomer permits incorporation into the polymer chain through the olefinic unsaturation.

Suitable chelating monomers include esters of acetylacetic and diacetylacetic acids such as acetoacetoxyethyl (meth) acrylate, acetoacetoxypropyl (meth)acrylate, diacetoacetoxyethyl (meth)acrylate, diacetoacetoxypropyl (meth) acrylate, vinyl acetoacetate, vinyl diacetoacetate, allyl acetoacetate, and allyl diacetoacetate. One method of preparing the polymer is to use emulsion polymerization so that the polymer is obtained in the form of a polymer latex. Conventional free radical initiation systems used in emulsion polymerization may be used in preparing these polymer latices. These initiation systems include, for example, peroxidic and diazo compounds such as ammonium persulfate, potassium persulfate, sodium persulfate, tert-butyl hydroperoxide, hydrogen peroxide, peroxydiphosphates, 4,4'-azobis(4-cyanovaleric acid), 2,2'-azobisisobutyronitrile, as well as redox systems known to one skilled in the art.

Conventional surfactants and emulsifying agents can be employed in making the polymer. Polymerizable surfactants that can be incorporated into the polymer also can be used. For example, anionic surfactants can be selected from the broad class of sulfonates, sulfates, ethersulfates, sulfosuccinates, phosphates and the like, the selection of which will be readily apparent to anyone skilled in the art. Nonionic surfactants may also be used to improve film and glove characteristics, and may be selected from the family of alkylphenoxypoly(ethyleneoxy)ethanols where the alkyl group typically varies from $C_7$–$C_{18}$ and the ethylene oxide units vary from 4–100 moles. Various preferred surfactants in this class include the ethoxylated octyl and nonyl phenols. Ethoxylated alcohols are also desirable surfactants. A typical anionic surfactant is selected from the diphenyloxide disulfonate family, such as benzenesulfonic acid, dodecyloxydi-, disodium salt. In addition to, or in place of the surfactants, a polymeric stabilizer may be used in the composition of the invention.

Additional ingredients which may be used include, but are not limited to, other chelating agents (e.g., ethylenediaminetetraacetic acid), dispersants (e.g., salts of condensed naphthalenesulfonic acid); buffering agents (e.g., ammonium hydroxide); and polymerization inhibitors (e.g., hydroquinone). Chain transfer agents (e.g., carbon tetrachloride, butyl mercaptan, bromotrichloromethane and t-dodecyl mercaptan) may also be used in the invention. The polymer is crosslinked with addition of a source of polyvalent metal ions. Suitable polyvalent metal ions include $Al^{3+}$, $Ba^{2+}$, $Ca^{2+}$, $Co^{2+}$, $Co^{3+}$, $Cu^{2+}$, $Fe^{2+}$, $Fe^{3+}$, $Mg^{2+}$, $Mn^{2+}$, $Mn^{3+}$, $Mn^{4+}$, $Ni^{2+}$, $Pb^{2+}$, $Pb^{4+}$, $Sn^{2+}$, $Sn^{4+}$, $Sr^{2+}$, $Ti^{2+}$, $Ti^{3+}$, $Ti^{4+}$, $Zn^{2+}$, $Zr^{4+}$. Polyvalent metal ion crosslinking agents known to be effective in the ionic crosslinking of carboxylated polymers such as zinc, calcium, lead, and magnesium oxides are particularly useful in polymers containing chelating and carboxylic functionalities. Both ionic crosslinking and crosslinking by chelation can occur with these polymers.

Typically, the polymer composition comprises about 5 to about 99.9 percent by weight of at least one olefinically unsaturated monomer, and from about 0.1 to about 30 percent by weight of the composition of the chelating monomer. The polyvalent metal ion crosslinking agent is added in the amount of from about 0.1 to about 45 percent by weight of polymer.

The invention also relates to a crosslinked film formed from a polymer described herein above. Numerous articles of manufacture can be formed from the crosslinked film and polymer latex composition according to the process of the invention. Such latex articles generally include those which are typically made from natural rubber and which contact the human body.

The films can be made into self-supported or form stable articles. The films are mechanically self-supporting without significant deformation, i.e., it can maintain its dimensions (e.g., length, thickness, circumference, etc.) against gravity without any exterior support such as a mold. It is recognized by those skilled in the art, the article could be supported, e.g., lined, if additional support is desired. Exemplary articles of manufacture include, but are not limited to, gloves, condoms, medical devices, catheter tubes, bags, balloons, and blood pressure bags. Exemplary techniques are described in U.S. Pat. No. 5,084,514 to Szczechura et al., the disclosure of which is incorporated by reference herein in its entirety.

Typically, the polymer latex composition is prepared by emulsion polymerization. The composition can be compounded with one or more crosslinkers along with antioxidants, fillers, and other ingredients. The compounding or mixing may be done in any suitable manner. The resulting latex composition typically has a tensile strength greater than about 1500 psi and an elongation at break greater than about 400%.

The article of manufacture can be made in any suitable manner. For example, suitable forms or molds in the shape of a hand are heated in an oven, and are optionally immersed or dipped into a coagulant. A suitable coagulant includes, for example, a solution of a metal salt, preferably calcium nitrate, in water or alcohol. The form is then withdrawn from the coagulant, and the excess liquid is permitted to dry. As a result, a residual coating of coagulant is left on the form. The form coated with the coagulant is then immersed or dipped into the polymer dispersion containing the polymer composition of the present invention. The latex coagulates and forms a film on the form. The amount of time the form is immersed in the latex typically determines the thickness of the film. The longer the dwell time, the thicker the film.

The form is then removed from the latex, and is immersed in a water bath to remove the coagulant and some of the surfactant. The latex coated form is then placed in a drying oven at a temperature preferably between about 60° C. and about 100° to remove water from the film. When the film is dry, the mold is placed in a curing oven preferably at a temperature between about 100° C. and 170° C. for about 5 to about 30 minutes. If desired, the same oven can be used for drying and curing, and the temperature can be increased with time.

The cured glove is removed from the form. It may be powdered or postprocessed for ease of removal and for ease of donning. The glove preferably has a thickness ranging from about 3 mil to about 20 mil.

In addition to the above, the crosslinked film and article of manufacture produced in accordance with the invention can contain additional (at least a second) polymeric films in contact thereto so as to form composite structures. The application of the additional polymeric films may be achieved by techniques which are known in the art. For example, the polymeric films may be formed on the crosslinked film and article by coating, spraying, or "overdipping". The resulting materials may then be dried and cured in accordance with known and accepted techniques. The additional polymeric films may be formed from a wide number of materials including, but not limited to, neoprene, nitriles, urethanes, acrylics, polybutadiene, polyisoprene, and the like. Mixtures of the above may also be used. The additional polymeric films may be present in a variety of configurations. For example, in one embodiment, an additional film may be positioned above the crosslinked film. In a second embodiment, an additional film may be positioned below the crosslinked film. In a third embodiment, the crosslinked film may be located between two additional films. The configurations of different films may be selected as desired by the skilled artisan.

The crosslinked film of the invention may be used in conjunction with other conventional materials, such as textile substrate which may be present in the form of an article such as a glove, for example. As an example, supported gloves are well known in the art. In this instance, the crosslinked film typically covers or is lined by the textile substrate, although other configurations are possible. For the purposes of the invention, the term "textile" is to be broadly interpreted and may be formed from a variety of synthetic and natural materials such as, but not limited to, nylon, polyester, and cotton. Blends and mixtures thereof may also be used.

Another use of the polymer composition is for gaskets such as described in pending application, Ser. No. 09/747,905, the disclosure of which is incorporated herein by reference in its entirety. Fiber-based gaskets are currently manufactured on a paper machine, using either a Fourdriner or Cylinder machine. Various fibers, fillers, and latex are incorporated depending on the end-performance requirements, the selection of which will be within the skill of one in the art. The primary purpose of a gasket is to seal or provide a barrier to the interfaces of imperfect or incompatible parts. The proper gasket selection is made after a careful review of the conditions the gasket is likely to encounter. This includes the condition on the flange being sealed, the amount of torque placed on the flange, the fluids that the gasket may encounter and the temperature at which the gasket is exposed. In order to obtain the best compression resistance, a curative is incorporated to cross-link the polymer under elevated temperatures. The specific crosslink temperature can be obtained during a secondary treatment to the gasket before shipping, or it may be obtained once the gasket is in place. For butadiane copolymers, the conventional cure package consists of sulfur, accelerator, and zinc oxide (vulcanizing package). While this cure package is effective in providing the required performance properties, it also has several negative features associated with the use of sulfur. Namely, excess sulfur blooms to the surface of the gasket with time. This causes a dusty residue that interferes with post treatments such as a release coat, laminating adhesive, or trade-marking. Additionally, excess sulfur is a nuisance to plant workers during the post-curing process when excessive smoke and fumes are generated. Excessive sulfur also inhibits the cure mechanism of post-added silicone beading. Excess sulfur does not improve the overall cure of the gasket and is a negative expense. Thus use of the polymer of the present invention obviates the need to use sulfur in the cure package.

The following examples are merely illustrative of the invention, and are not limiting thereon.

EXAMPLE 1

153 phm (parts per hundred monomer) of demineralized water, 2.75 phm of the ammonium salt of linear dodecylbenzene sulfonic acid, 0.05 phm of the ammonium salt of ethylenediaminetetraacetic acid, 0.2 phm of the sodium salt of condensed naphthalene sulfonic acid, 0.1 phm tetrapotassium pyrophosphate, 0.6 phm tert-dodecylmercaptan 55 phm 1,3-butadiene, 39 phm acrylonitrile, 3 phm methacrylic acid, and 3 phm acetoacetoxyethyl methacrylate were charged to a reactor. The temperature of the reactor was raised to 120° F. and 0.07 phm potassium persulfate added. After 420 minutes the temperature of the reactor was raised to 125° F. and after 510 minutes it was further raised to 127° F. At 555 minutes, 0.25 phm di-tertamylhydroquinone and 0.1 7 phm ammonium hydroxide were added. Conversion was determined to be 89.1%. The latex was diluted to 35% solids and then concentrated to 43.5% solids. The pH was adjusted to 7.1 using ammonium hydroxide. The viscosity was measured to be 30 cPs. The latex was further compounded by adding 1 phr (active parts per hundred parts latex solids) of the ammonium salt of linear dodecylbenzene sulfonic acid, 1 phr of Rotec SPL and 1.75 phr zinc oxide. The pH was adjusted to 8.5 with ammonium hydroxide.

The latex was coagulated onto metal plates by preheating the metal plate to 70° C. and then immersing the metal plate in a 35% ethanolic calcium nitrate solution. The plates were partially dried and then immersed into the latex and removed after approximately 10 seconds. The plates were allowed to air dry for 60 seconds and the placed in a bath of warm flowing water for 4 minutes. The plates were placed in a 70° C. oven for 30 minutes and than a 135° C. oven for 15 minutes. The plates were allowed to cool and films removed. After conditioning overnight at 70° F. and 50% R.H., tensile properties were measured using ASTM D-412 and are given in Table 1 below.

TABLE 1

| Property | M100 | M200 | M300 | M400 | M500 | Tb | Eb |
|---|---|---|---|---|---|---|---|
| Ex. 1 | 238 | 359 | 514 | 761 | 1225 | 2632 | 593 |

M100–M500: modulus (psi)
Tb: Tensile strength (psi)
Eb: Elongation at break (%)

COMPARATIVE EXAMPLE

A set of gloves was prepared from the latex compound described in Example 1. A second set of gloves was prepared using the same procedure using a conventional latex in the absence of a conventional cure system. The latex used was Tylac® 69077 compounded with 0.5 phr of the ammonium salt of dodecylbenzene sulfonic acid, 1.75 phr zinc oxide, and ammonia to pH 8.5. A third set of gloves was also prepared from Tylac® 68077 compounded as above but also including a conventional cure system consisting of 0.25 phr zinc dibutyl dithiocarbamate and 0.5 phr sulfur. The gloves were worn under similar conditions to evaluate durability. The gloves prepared using the conventional latex in the absence of a conventional cure system failed (e.g., split, tear, or developed holes) after approximately 1.5–2.5 hours. In contrast, the gloves made from conventionally cured latex or the latex described in the Example did not fail during the 4 hours that they were worn.

EXAMPLE 2

153 phm of demineralized water, 2.75 phm of sodium dodecylben-benzenesulfonate, 0.05 phm of the ammonium salt of EDTA, 0.2 phm of the sodium salt of condensed naphthalene sulfonic acid, 0.1 phm of tetrapotassium pyrophosphate, 0.6 phm of tert-dodecylmercaptan, 58 phm 1,3-butadiene, 36 phm acrylonitrile, 3 phm methacrylic acid, and 3 phm of acetoacetoxyethyl methacrylate were charged into a reactor. The temperature of the reactor was raised to 105° F. and 0.025 phm of potassium persulfate was added. The following temperature adjustments were made: 110° F. at 30 minutes, 115° F. at 1.25 hrs, 120° F. at 2 hours, 125° F. at 7 hours, 130° F. at hours and 140° F. at 9.5 hours. At 13.5 hours the 0.72 phm of triethanolamine and 0.25 phm of ditertamylhydorquinone were added and the conversion determined to be 91.7%. The pH was adjusted to 7.3 using triethanolamine, and the latex was concentrated to 44.4% solids. The viscosity of the latex as determined to be 44 cPs.

EXAMPLE 3

A polymer latex was prepared as in Example 2 using 0.8 phm of tert-dodecylmercaptan rather than 0.6 phm. The final conversion was determined to be 90.4%. The pH was adjusted to 7.5 and the latex was concentrated to 45% solids. The viscosity was 40 cPs.

EXAMPLE 4

A polymer latex was prepared as in Example 2 using 1 phm of tert-dodecylmercaptan rather than 0.6 phm. The final conversion was determined to be 90.7%. The pH was adjusted to 7.2 and the latex was concentrated to 43.1% solids. The viscosity was 26 cPs.

EXAMPLE 5

The latices described in Examples 3 and 4 were compounded by adding 1.5 phr sodium dodecylbenzene sulfonate, 0.2 phr Vancide TH, 1 phr Rotec SPL, demineralized water (to 30% solids), triethanolamine (to pH 8.7–9.0), and 1.75 phr zinc oxide.

A commercial carboxylated nitrile latex used in glove applications Tylac® 68077 was compounded with demineralized water (to 30% solids), 0.5 phr sodium dodecylbenzene sulfonate, triethanolamine (to pH 8.7–9.0) and 1.75 phr zinc oxide (labeled 68077). Another compound (labeled 68077-S) also contained a sulfur cure system consisting of 0.25 phr zinc dibutyl dithiocarbamate and 0.5 phr sulfur.

The compounded latices were coagulated onto ceramic plates by preheating the plates to 70° C. and then immersing the plates in 40% aqueous calcium nitrate. The plates were removed and allowed to dry 1 minute before being immersed in the latex for approximately 10 seconds. The plates were removed and allowed to air dry for approximately 1 minute before being placed in a bath of warm flowing water for 4 minutes. They were then placed in a 70° C. oven for 30 minutes, followed by 15 minutes in a 135° C. oven. The plates were allowed to cool and the films were removed. After conditioning overnight in a controlled environment room at 70° F., and 50% R.H., tensile properties were measured using ASTM D-412. The properties are given in Table 2 below:

TABLE 2

| Property | M100 | M200 | M300 | M400 | M500 | Tb | Eb |
|---|---|---|---|---|---|---|---|
| Ex. 3 | 243 | 357 | 498 | 712 | 1098 | 2372 | 625 |
| Ex. 4 | 219 | 323 | 436 | 582 | 785 | 2264 | 801 |
| 68077 | 314 | 481 | 664 | 917 | 1346 | 3801 | 660 |
| 68077-S | 313 | 495 | 696 | 979 | 1471 | 4098 | 633 |

M100–M500: modulus (psi)
Tb: Tensile strength (psi)
Eb: Elongation at break (%)

Further testing was conducted on films from these compounds. Specimens of the cured films were cut and immersed in acetone for 48 hours. The 68077-S, Example 3 and Example 4 films maintained their integrity during the acetone soak. The 68077 films disintegrated during the acetone soak, indicating the crosslinking in these films lacks durability. Accordingly, the use of zinc oxide alone proved to be an inadequate cure system with the conventional polymers. When a sulfur cure system was used (68077-S), the cure of the conventional polymer became suitable. The polymers prepared according to this invention, Examples 3 and 4, provided a suitable cure with zinc oxide alone.

After soaking in acetone, the intact films were removed, excess acetone on the surface removed, and the films place in a controlled environment room (70° F. and 50% R.H.) for 24 hours. Tensile properties were then measured. The results are summarized in Table 3:

TABLE 3

| Property | M100 | M200 | M300 | M400 | M500 | Tb | Eb |
|---|---|---|---|---|---|---|---|
| Ex. 3 | 254 | 382 | 522 | — | — | 738 | 364 |
| Ex. 4 | 236 | 376 | 549 | 805 | 1227 | 2577 | 662 |
| 68077-S | 264 | 422 | 597 | 849 | 1317 | 5058 | 686 |

M100–M500: modulus (psi)
Tb: Tensile strength (psi)
Eb: Elongation at break (%)

EXAMPLE 6

A polymer latex was prepared as in Example 4 except the final conversion was determined to be 90.3%. The pH was adjusted to 7.45, and it was concentrated to 43.6%. The viscosity was determined to be 32 cPs.

EXAMPLE 7

Gasket Preparation

A typical gasket recipe contains approximately 11% fiber, 65% filler, 16% latex (includes cure package), and 8% miscellaneous ingredients (flocculants, retention aids, antioxidants, etc.). The fibers and fillers are slurried in water to approximately 1.5% consistency. The latex is added to the slurried fiber/filler mix and is chemically destabilized onto the fiber/filler surfaces. This process binds the ingredients together. The slurry is then pumped to the head box and drained on the forming wire. Additional water is removed through heated drying cans.

For the laboratory testing, the gaskets were prepared using the procedure above, except a hand sheet forming headbox was used to drain the water from the slurry. The gaskets were dried on a rotating drum drier for 10 minutes at 200° F. and then subsequently cured in a forced air oven for 10 minutes at 350° F. The chemical used for destabilization was alum. Alum was added until the aqueous solution became clear; a level of approximately 40 weight percent on the basis of latex solids.

Fluid Testing

Cured gaskets are cut into 1"×6" test strips for tensile strength determination. Caliper is recorded on all test samples. Gasket strips are separated for testing in the following fluids and times:

1. ASTM Oil #1 (aromatic oil)–5 hours @ 280° F.
2. ASTM Oil #3 (aliphatic oil)–5 hours @ 280° F.
3. Commercially available antifreeze cut 1:1 with water ("Glycol" in Table 4)–5 hours @ rapid boil.\

After the designated fluid submersions, the test strips are blotted with high absorbency blotting paper, weighted and caliper recorded. Tensile strength is determined using a standard tensile tester with a clamp separation of 4" and an extension rate of 6"/minute.

Gaskets were prepared as described above without the use of a sulfur cure package using the lattices prepared as described in Examples 2, 3, and 6.

Crosslinking by chelation results from metal salts introduced in the gasket preparation procedure. For comparative purposes, a series of control gaskets were made as described above using the sulfur based cure system. The control gaskets were made using Tylac® 68520-00, Tylac® 68513-00, commercial lattices used in gasketing applications. Table 4 contains a summary of the tensile data from these gaskets both dry and after fluid testing. The gaskets prepared according to this invention provide suitable performance without use of a sulfur cure package.

TABLE 4

| | Tensile Strength (psi) | | | |
|---|---|---|---|---|
| Gasket | None (Dry) | Glycol | ASTM Oil #1 | ASTM Oil #3 |
| 68520-00 (1) | 892 | 168 | 996 | 904 |
| 68520-00 (2) | 909 | 124 | 944 | 869 |
| 68074-00 | 897 | 131 | 994 | 882 |
| 68513-00 | 1294 | 386 | 1248 | 1074 |
| Example 2 | 1036 | 629 | 1499 | 1332 |
| Example 3 | 1168 | 740 | 1583 | 1580 |
| Example 6 | 1224 | 389 | 1290 | 1171 |

In the specification and example, there have been disclosed typical preferred embodiments of the invention and, although specific terms are employed, they are used in a generic and descriptive sense only and not for purposes of limitation of the scope of the invention being set forth in the following claims.

That which is claimed:

1. A polymer formed from olefinically unsaturated monomers wherein the polymer contains at least one conjugated diene monomer and additional functionality is provided by a chelating monomer and wherein the chelating monomer has the structure

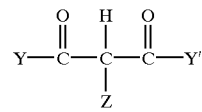

wherein Z is

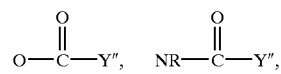

or Y", and Y, Y' and Y" are independently selected from the group consisting of NRR', OR or R wherein R and R' are independently selected from the group consisting of hydrogen and aliphatic, alicyclic, aromatic and heteroaromatic groups and wherein the structure has olefin unsaturation.

2. The polymer according to claim 1, wherein the chelating monomer is an acetoacetoxy or diacetoacetoxy monomer.

3. The polymer of claim 2, wherein the acetoacetoxy monomer is selected from the group consisting of esters of acetylacetic and diacetylacetic acids.

4. The polymer of claim 1, wherein said composition is crosslinked with a polyvalent metal ion crosslinking agent.

5. The polymer according to claim 1, wherein the $C_4$ to $C_9$ diene is 1,3-butadiene.

6. The polymer according to claim 1, wherein in addition to the conjugated diene monomer and chelating functionality, the polymer contains an α,β-unsaturated nitrile monomer.

7. The polymer according to claim 1, wherein in addition to the conjugated diene monomer and chelating functionality, the polymer contains a α,β-unsaturated carboxylic acid monomer and anhydrides or aliphatic, alicyclic, aromatic and heteroaromatic partial esters thereof such that the carbon skeletons of the base alcohols of the esters contain from about 1 to 20 carbon atoms.

8. The polymer according to claim 1, wherein in addition to the conjugated diene monomer and chelating functionality, the polymer contains a vinyl aromatic monomer.

9. The polymer according to claim 1, wherein in addition to the conjugated diene monomer and chelating functionality, the polymer contains an additional monomer selected from the (partial) amides of a α,β-unsaturated carboxylic acid monomer such that the carbon skeleton of the base amine of the amides contains from about 1 to 20 carbon atoms, vinyl halides, or the vinyl ester of aliphatic carboxylic acids having from about 2 to 20 carbon atoms.

10. A polymer latex composition formed from olefinically unsaturated monomers and having at least one conjugated diene monomer, the improvement comprising functionalizing the latex composition with a chelating monomer wherein the chelating monomer has the structure

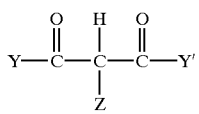

wherein Z is

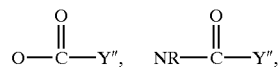

or Y", and Y, Y' and Y" are independently selected from the group consisting of NRR', OR or R wherein R and R' are independently selected from the group consisting of hydrogen and aliphatic, alicyclic, aromatic and heteroaromatic groups and wherein the structure has olefin unsaturation.

11. The polymer of claim 10, wherein said composition is crosslinked with a polyvalent metal ion crosslinking agent.

12. The polymer latex composition of claim 10, wherein said composition is crosslinked with a polyvalent metal ion crosslinking agent.

13. The polymer latex composition according to claim 10, wherein the chelating monomer is an acetoacetoxy or diacetoacetoxy monomer.

14. The polymer latex composition of claim 13 wherein the acetoacetoxy monomer is selected from the group consisting of esters of acetylacetic and diacetylacetic acids.

15. The polymer latex composition according to claim 10, wherein the conjugated diene monomer is a $C_4$ to $C_9$ diene.

16. The polymer latex composition according to claim 15, wherein the $C_4$ to $C_9$ diene is 1,3-butadiene.

17. The polymer latex composition according to claim 10, wherein in addition to the conjugated diene monomer and chelating functionality, the polymer contains an α,β-unsaturated nitrile monomer.

18. The polymer latex composition according to claim 10, wherein in addition to the conjugated diene monomer and chelating functionality, the polymer contains a vinyl aromatic monomer.

19. The polymer latex composition according to claim 18, wherein the vinylaromatic monomer is selected from the group consisting of styrene, methylstyrene, vinyl toluene, chlorostyrene, vinyl benzyl chloride, vinyl pyridines, vinyl naphthalene, p-methylstyrene, p-methoxystyrene, and blends and mixtures thereof.

20. The polymer latex composition according, to claim 10, wherein in addition to the conjugated diene monomer and chelating functionality, the polymer contains an additional monomer selected from the (partial) amides of a α,β-unsaturated carboxylic acid monomer such that the carbon skeleton of the base amine of the amides contains from about 1 to 20 carbon atoms, vinyl halides, or the vinyl ester of aliphatic carboxylic acids having from about 2 to 20 carbon atoms.

21. A glove formed from the polymer latex composition of claim 10.

* * * * *